US006901328B2

(12) United States Patent
Damson et al.

(10) Patent No.: US 6,901,328 B2
(45) Date of Patent: May 31, 2005

(54) METHOD AND ARRANGEMENT FOR DETECTING THE END OF A START OPERATION IN AN INTERNAL COMBUSTION ENGINE OF A MOTOR VEHICLE

(75) Inventors: Eckart Damson, Gelingen (DE); Martin Klenk, Backnang (DE); Burkhard Hiller, Oberriexingen (DE); Werner Hess, Stuttgart (DE); Uwe Kassner, Moeglingen (DE); Juergen Foerster, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/420,888

(22) Filed: Apr. 23, 2003

(65) Prior Publication Data

US 2003/0196630 A1 Oct. 23, 2003

(30) Foreign Application Priority Data

Apr. 23, 2002 (DE) ........................................ 102 18 011

(51) Int. Cl.[7] ................................................ G06F 19/00

(52) U.S. Cl. .................... 701/113; 701/112; 123/90.56; 123/90.57; 123/491

(58) Field of Search ................................ 701/113, 112; 123/491, 90.56, 90.57

(56) References Cited

U.S. PATENT DOCUMENTS 5,009,211 A * 4/1991 Kushida et al. ............. 123/491
5,063,510 A * 11/1991 Jurgens et al. ................ 701/58
6,029,631 A * 2/2000 Jiewertz et al. ............. 123/491
6,192,311 B1 * 2/2001 Yasui et al. ................. 701/113

* cited by examiner

*Primary Examiner*—Willis R. Wolfe
*Assistant Examiner*—Johnny H. Hoang
(74) *Attorney, Agent, or Firm*—Walter Ottesen

(57) ABSTRACT

A method and an arrangement for detecting the end of a start operation in an internal combustion engine (1) of a motor vehicle make it possible to distinguish the start operation from a steady-state condition of the engine (1) even for starters having a high starter rpm. At least one operating variable of the engine is determined which is different from the rpm thereof. The at least one operating variable is compared to a pregiven threshold value. The end of the start operation is detected when the at least one operating variable reaches or exceeds the threshold value.

10 Claims, 2 Drawing Sheets

METHOD AND ARRANGEMENT FOR DETECTING THE END OF A START OPERATION IN AN INTERNAL COMBUSTION ENGINE OF A MOTOR VEHICLE

BACKGROUND OF THE INVENTION

At the present time, the internal combustion engine in a motor vehicle is started with a starter which usually rotates at an rpm of 150 to 300 rpm depending upon the battery voltage and the temperature. The combustion of the air/fuel mixture in the cylinders occurs with the beginning of the injection of fuel into the cylinders of the engine and ignition of the air/fuel mixture. The internal combustion engine now generates a torque and runs up to settle at the idle rpm of approximately 800 rpm. For the engine control and the functions which run in the control, it is important to recognize whether and when the engine runs at steady state. This is recognized based on an rpm threshold which lies clearly above the starter rpm, that is, at 600 rpm, for example. When the engine exceeds this threshold, then the end of the start operation is detected and this is communicated to the engine control.

SUMMARY OF THE INVENTION

The method and arrangement of the invention afford the advantage with respect to the foregoing that at least one operating variable of the engine is determined which is different from the rpm of the engine and that this at least one operating variable is compared to a pregiven threshold value and that the end of the start operation is detected when the operating variable reaches or exceeds the threshold value. In this way, the end of the start operation is detected independently of the rpm of the engine. In this way, the use of starters is made possible whose rotational speeds (rpms) extend up to the idle range between approximately 700 to 1250 rpm. The method of the invention and the arrangement of the invention also make possible the detection of the end of the start operation for such starters and therefore the detection of reaching the steady-state condition of the engine.

The use of an operating variable is especially advantageous which can be measured by means of available sensor means. These operating variables include: the combustion chamber pressure, the vibration of the engine, rpm fluctuations of the engine, the conductivity between two spark plug electrodes and the combustion chamber pressure change. The functionality of the existing sensor devices can be increased in this manner because they can be used also for the detection of the end of the start operation of the engine.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
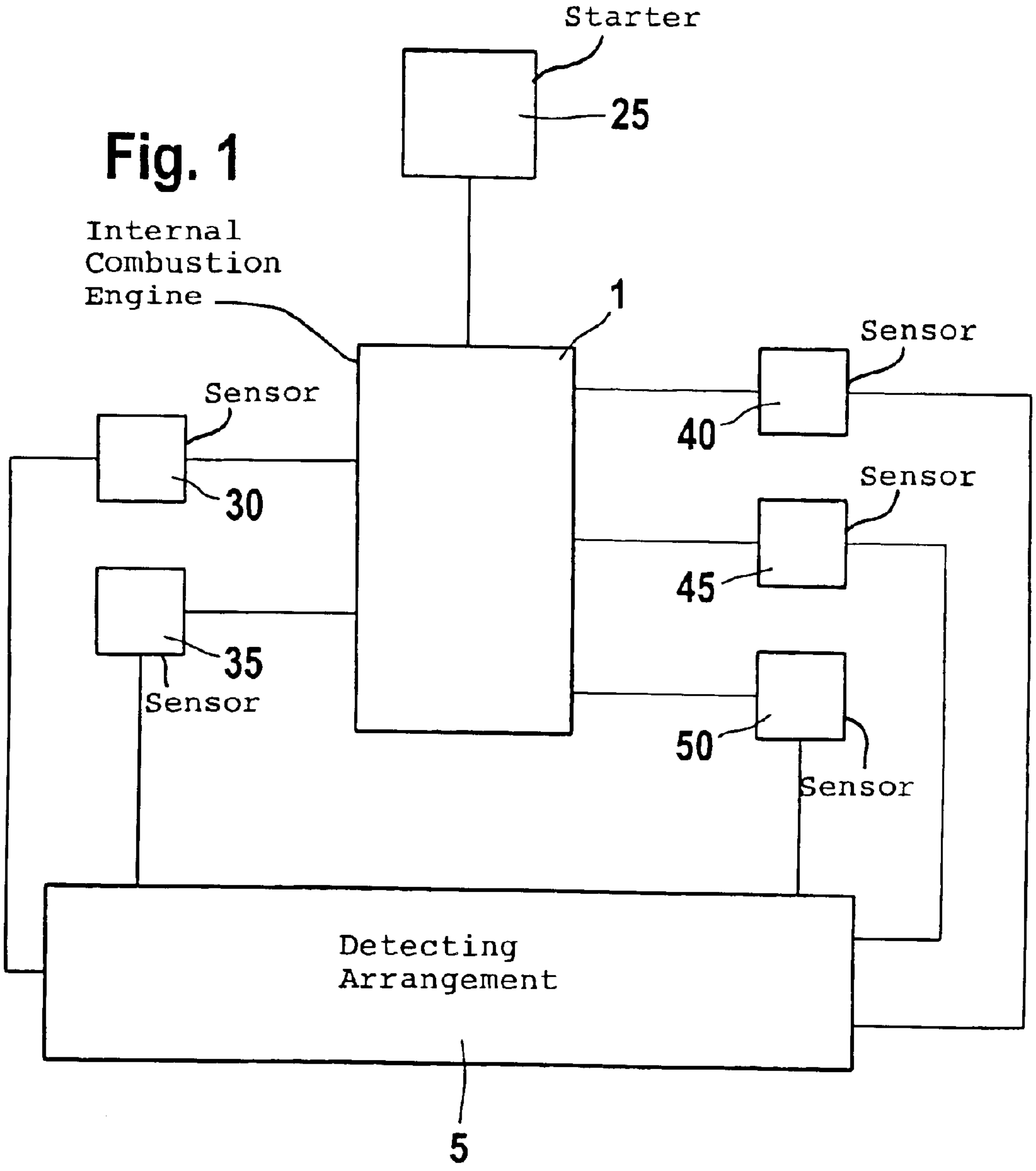
FIG. 1 is a block circuit diagram with an arrangement according to the invention.

In FIG. 1, reference numeral 1 identifies an internal combustion engine of a motor vehicle. The engine 1 is connected to a starter 25. In FIG. 1, five sensors (30, 35, 40, 45, 50) are shown which detect respective operating variables of the engine which are different from the rpm thereof. The five sensors (30, 35, 40, 45, 50) are operatively connected to the engine 1. Different sensors determine different operating variables of the engine 1. There can be more or less than the five sensors (30, 35, 40, 45, 50). In the example of FIG. 1, reference numeral 30 identifies a combustion chamber pressure sensor and 35 an optical sensor. Reference numeral 40 identifies a knock sensor or body-sound sensor and 45 identifies a rough-running sensor and 50 identifies an ion current sensor. The five sensors (30, 35, 40, 45, 50) are connected to an arrangement 5 for detecting the end of a start operation of the engine 1.

In future, one will start at higher rpm than is usual in the present day in order to reduce the high exhaust-gas emissions when starting the internal combustion engine 1. This can be realized by correspondingly designed starters or even with the aid of a starter generator. The rpms reached therewith extend up to and into the idle range which reach approximately 700 to 1250 rpm. For this reason, the rpm of the engine can no longer be used as an index as to whether the engine is at steady state and the start operation of the engine is ended. The engine control cannot distinguish whether the conventional rpm threshold of 600 rpm for detecting the end of the start operation was exceeded because the engine is at steady state or whether the starter is still driving. For this reason, other signals for detecting the end of the start operation must be applied in order to determine whether the engine has reached its steady-state condition.

Figure 3:
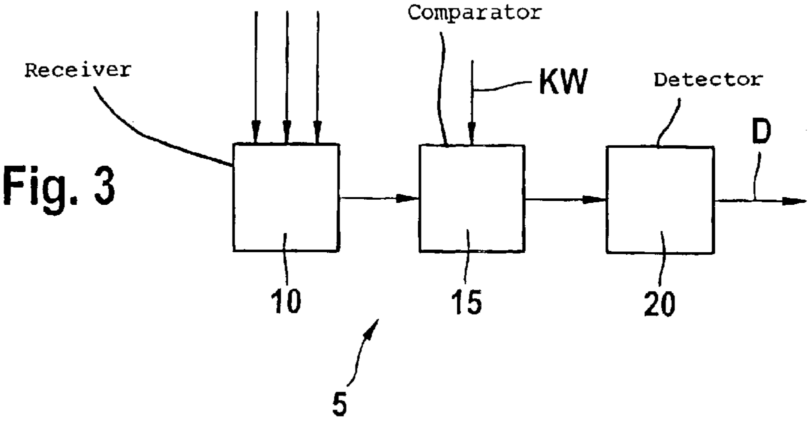
FIG. 3 is a block circuit diagram of the arrangement of the invention.

In FIG. 3, the arrangement 5 is shown in greater detail with respect to a block circuit diagram. The arrangement 5 includes means 10 for receiving at least one operating variable of the engine 1. The operating variables, which are determined by the sensors (30, 35, 40, 45, 50), are therefore supplied to the means 10. This is shown symbolically by the three input arrows of the means 10 in FIG. 3. The arrangement 5 further includes means 15 for comparing the at least one operating variable to a pregiven threshold value. A pregiven threshold value can be stored in means 15 for each determined operating variable. The at least one operating variable is supplied from the means 10 to the means 15. The arrangement 5 further includes means 20 for detection. The comparison results from the means 15 are supplied to the means 20 and, when the at least one operating variable reaches or exceeds the particular threshold value, the means 20 detects the end of the start operation and therefore the reaching of the steady-state condition of the engine. The means 20 can output a detection signal D when detecting the end of the start operation. The detection signal D is, for example, supplied to the engine control in order to inform the engine control as to the end of the start operation and the reaching of a steady-state condition of the engine 1.

In the following, the operation of the individual sensors (30, 35, 40, 45, 50) will be viewed in the context of the detection of the end of the start operation of the engine 1. The combustion chamber pressure sensor 30 is mounted in a combustion chamber of the engine 1, for example, in a cylinder. For the case that the engine 1 has more than one cylinder, a compression chamber pressure sensor can, for example, be provided for each cylinder. The combustion chamber pressure sensor 30 is mounted on the compression chamber wall of the corresponding cylinder and generates a measurement signal proportional to the detected pressure in the combustion chamber. The measurement signal is thereby an index for the pressure in the combustion chamber. The gradient of the measurement signal of the combustion chamber pressure signal 30 is an index for the pressure gradient in the combustion chamber. With the start of the engine 1 by means of a starter which is, for example, driven by an electric motor, a pressure results in the combustion chamber in the order of magnitude of approximately 8 to 10 bar and a comparatively slight pressure gradient. In contrast to this and for the engine 1 in the steady-state condition, a considerably higher pressure in the combustion chamber results in the compression and expansion phases of the particular cylinder with this pressure being in the order of magnitude of, for example, approximately 20 bar. During the compression and expansion phases of the particular cylinder, the pressure gradient in the combustion chamber of the cylinder is also considerably greater than for a starter-driven internal combustion engine during the start operation. A first pregiven threshold value for the pressure can be stored in the means 15. The first pregiven threshold value is so selected that it lies between the maximum pressure in the combustion chamber during the start operation and a reliably obtainable pressure in the combustion chamber during the compression and expansion phases in the steady-state condition of the engine. The first pregiven threshold value can, for example, be selected at 15 bar. If the first pregiven threshold value is reached or exceeded by the measurement signal of the combustion chamber pressure sensor 30, then the means 20 detect an end of the start operation and the occurrence of the steady-state condition of the engine 1.

In addition or alternatively, a second pregiven threshold value for the pressure gradient can be stored in the means 15. The second pregiven threshold value too is so selected that it lies between the pressure gradient, which maximally occurs in the combustion chamber during the start operation, and a pressure gradient which is reliably obtained in the combustion chamber with the steady-state condition of the engine during the compression and expansion phases. Correspondingly, the end of the start operation and the reaching of the steady-state condition of the engine 1 can be detected by the means 20 when the pressure gradient reaches or exceeds the second pregiven threshold value. The pressure gradient is obtained from the measurement signal of the compression chamber pressure sensor 30, with the comparison by the means 15.

Information as to the instantaneous crankshaft angle is to be supplied to the arrangement 5 and especially the means 15 as shown in FIG. 3 so that the comparison of the measurement signal of the combustion chamber pressure sensor 30 to the first pregiven threshold value or the comparison of the gradient of this measurement signal to the second pregiven threshold value can also be carried out for the compression and expansion phases. The detection of the crankshaft angle takes place in a manner known per se, for example, by means of a crankshaft angle sensor. The crankshaft angle, which is detected and supplied to the means 15, is identified in FIG. 3 by reference characters KW.

The optical sensor 35 can, for example, be mounted in the region of or at the spark plug of a cylinder and can detect and couple out the optical radiation present in the combustion chamber. The out-coupled optical radiation can then be evaluated in an evaluation element of the optical sensor 35. The intensity of the light can be determined in the spectral range in which optical radiation is usually generated during the combustion in the combustion chamber, that is, during the steady-state condition of the engine. This can, for example, be in the infrared range and/or in the region of visible light. In contrast, during the start phase in which the engine is driven from the outside via the starter, no combustion in the combustion chamber takes place yet or the combustion is just starting so that the light intensity in the above-mentioned spectral range is zero or is comparatively low.

A third pregiven threshold value for the light intensity can be stored in the means 15 and this threshold value is so selected that it is greater than the maximum light intensity, which occurs with the start operation in the spectral range of interest, and is less than the light intensity which is usually reliably obtained in the steady-state condition of the engine. The optical sensor 35 can output a measurement signal to the arrangement 5 or the means 10 which is proportional to the light intensity in the spectral range of interest. A conclusion can be drawn directly from this measurement signal as to the light intensity. If the measurement value for the light intensity reaches the third pregiven value or exceeds the same in the comparison in the means 15, then the means 20 detect an end of the start operation and a reaching of the steady-state condition of the engine 1.

The structure-borne noise sensor 40 can be mounted as a sensor on the engine block of the internal combustion engine 1 and detects the mechanical vibrations of the engine block.

The intensity of the vibrations in a pregiven frequency range is determined by suitable filtering of the vibrations picked up by the structure-borne noise sensor 40. To generate a suitable measurement signal, the vibrations are first scanned and the formed scanning values are amplified and thereafter rectified. The rectified measurement signal is then filtered in order to detect the vibrations in the pregiven frequency range. A measurement value for the intensity of the vibrations in the pregiven frequency range is obtained by integration over the rectified and filtered signal. The pregiven frequency range can be selected in dependence upon the engine rpm and, if required, on the engine temperature and this frequency range lies in the region of several hundred Hz, for example, in the region of approximately 500 Hz. For an internal combustion engine in the steady state, mechanical vibrations occur in the pregiven frequency range and the intensity of these vibrations is detected by the structure-borne noise sensor 40 and is transmitted to the arrangement 5 or the means 10 based on the formed measurement signal. In contrast, during the start phase, that is when the engine 1 is driven by the starter 25, virtually no vibrations of the engine block of the internal combustion engine 1 result.

A fourth pregiven threshold value for the intensity of the vibrations of the engine block of the internal combustion engine 1 can be stored in the means 15. The fourth pregiven threshold value is so selected that it is greater than the vibration intensity in the pregiven frequency range, which vibration intensity maximally occurs during the start phase, and is less than the intensity of the vibrations of the engine block which are usually reached for the engine 1 in the steady state in the pregiven frequency range. When the measured intensity of the vibrations of the engine block during the comparison in the means 15 reaches the fourth pregiven threshold value or exceeds the same, then the means 20 detects the end of the start operation and an attainment of the steady-state condition of the engine 1. The intensity of the vibrations can be determined for forming the measurement signal via integration over the rectified and filtered vibration signal. The comparison of the measurement signal of the structure-borne noise sensor 40 to the fourth pregiven threshold value can be carried out as in the comparison of the pressure values in the compression and expansion phases of the corresponding cylinder because there the combustion primarily takes place and essentially no disturbance vibrations occur. The compression and expansion phases can, in turn, be determined by the crankshaft signal KW which is supplied to the means 15 as described.

As described, a knock sensor can be used as a structure-borne noise sensor and the functionality of the knock sensor is expanded in this way.

The rough-running sensor 45 includes an rpm sensor for determining the rpm of the engine 1. The rough-running sensor 45 derives a measurement signal from the gradient of the determined rpm, that is, from the determined rpm fluctuations. This measurement signal is an index for the rough running of the engine 1. During the start operation, the rpm fluctuations of the engine 1 are low compared to the engine in the steady-state condition. Thus, the rough running for an engine in the steady-state condition is greater than during the start phase wherein the engine is driven by the starter 25.

A fifth pregiven threshold value for the rough running can be stored in the means 15. The fifth pregiven threshold value can be so selected that it is greater than the rough-running value, which maximally occurs during the start operation, and less than the rough-running value which occurs usually and reliably during the steady-state condition of the engine. If, with a comparison by the means 15, the rough-running value, which is determined based on the measurement signal of the rough-running sensor 45, reaches or exceeds the fifth pregiven threshold value, then the means 20 detect an end of the start operation and the reaching of the steady-state condition of the engine 1.

The ion flow sensor 50 measures the conductivity between the center electrode and the ground electrode of the spark plug of a cylinder based on the ion current between the two electrodes. A corresponding ion flow sensor can be provided for each cylinder. The internal combustion engine 1 is driven by the starter 25 during the start operation so that no ignition by the spark plug occurs and therefore the electric resistance between the two electrodes is very large. As soon as the ignition starts and the engine starts to run, an ion current occurs between the two electrodes and the electric conductivity increases. The ion current or an integral over the ion current can be used as a measurement signal for the electric conductivity between the electrodes. The measurement signal is supplied to the arrangement 5 and to the means 10 therein. A sixth pregiven threshold value for the electric conductivity can be stored in the means 15. The sixth pregiven threshold value can be so selected that it is greater than the electric conductivity, which maximally occurs during the start operation, and is less than the electric conductivity value usually and reliably obtained during the steady-state condition of the engine. When the means 15 determine that the measured electric conductivity reaches the sixth pregiven threshold value or exceeds the same in the comparison of the measurement signal of the ion current sensor 50 to the sixth pregiven threshold value, then the means 20 detect an end of the start operation and a reaching of the steady-state condition of the engine 1.

The measurement signal of one of the above-mentioned sensors (30, 35, 40, 45, 50) is sufficient for detecting the end of the start operation. To ensure the detection results, it can be purposeful to evaluate the measurement signals of several sensors in the manner described. The described method for detecting the end of the start operation is, of course, not only suited for starters whose starter rpms already reach idle rpms in the range of approximately 700 to 1250 rpms, but is also suited for conventional starters whose starter rpms reach approximately 300 rpm and lie therefore below the idle rpm. With the use of an operating variable of the internal combustion engine which is different from the rpm of the engine, the advantage is in any event afforded that even for starters having a high starter rpm, the start operation can be distinguished from the steady-state condition of the engine.

Figure 2:
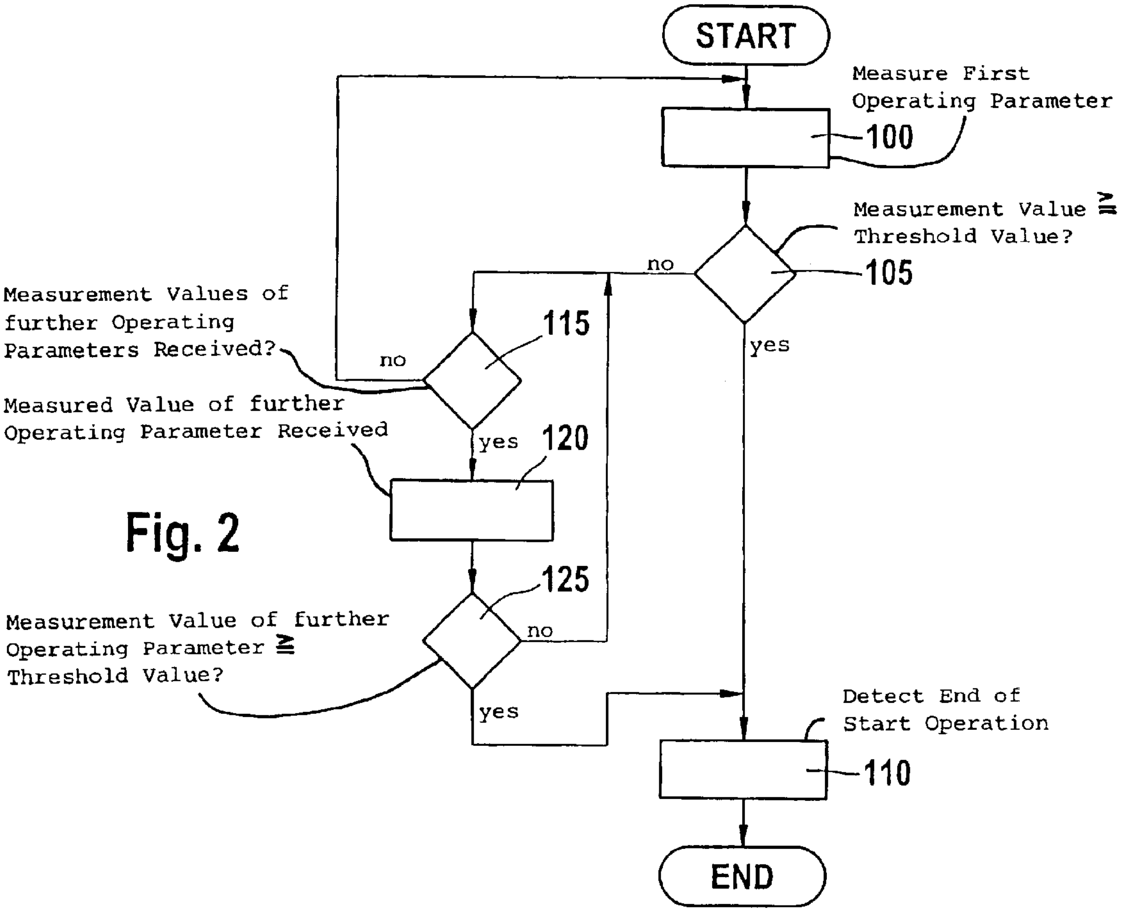
FIG. 2 is a sequence diagram explaining the method of the invention.

In FIG. 2, the method of the invention is further explained with respect to a sequence diagram. The program shown in FIG. 2 is started with the start of the internal combustion engine 1. At program point 100, a first operating parameter is measured by one of the sensors (30, 35, 40, 45, 50). This first operating parameter is different from the rpm of the engine 1. The measurement value is transmitted to the means 10 of the arrangement 5. Thereafter, the program branches to program point 105. At program point 105, the means 15 of the arrangement 5 check whether the measurement value, which is received from the means 10, is greater than or equal to the pregiven threshold value which is assigned to the first operating parameter. If this is the case, then there is a branching to program point 110; otherwise, there is a branching to program point 115. At program point 110, the means 20 detect an end of the start operation and a reaching of the steady-state condition of the engine 1 based on a comparison result. The means 20 thereupon generate the detection signal D and inform the engine control as to the end of the start operation and the reaching of the steady-state condition of the internal combustion engine. Thereafter, there is a movement out of the program.

At program point 115, the arrangement 5 checks whether measurement signals of further operating parameters are received by the means 10. If this is the case, then there is a branching to program point 120; otherwise, there is a branching back to program point 100. At program point 120, the means 10 receive the measurement value of a further operating parameter of the internal combustion engine 1 which is determined by a further sensor of the sensors (30, 35, 40, 45, 50) and is different from the rpm of the internal combustion engine 1. Thereafter, there is a branching to program point 125. At program point 125, the means 15 of arrangement 5 check whether the measurement value of the further operating parameter is greater than or equal to the threshold value pregiven for this further operating parameter. If this is the case, then there is a branching to program point 110; otherwise, there is a branching back to program point 115.

The invention is not limited to the described operating variables of the engine 1 for detecting the end of the start operation; rather, in a corresponding manner, the invention is applicable to any desired operating variables of the engine 1 which are different from the rpm of the engine 1.

It is understood that the foregoing description is that of the preferred embodiments of the invention and that various changes and modifications may be made thereto without departing from the spirit and scope of the invention as defined in the appended claims.

What is claimed is:

1. A method for detecting an end of a start operation in an internal combustion engine of a motor vehicle, the engine having a combustion chamber wherein a combustion chamber pressure is developed during operation of the engine and the method comprising the steps of:

determining at least one operating variable of said engine which is other than rpm of said engine;

comparing said at least one operating variable to a pregiven threshold; and, detecting the end of said start operation when said at least one operating variable reaches or exceeds said threshold value.

2. The method of claim 1, wherein said combustion chamber pressure is utilized as said operating variable.

3. The method of claim 1, wherein a light intensity in said combustion chamber is utilized as said operating variable.

4. The method of claim 1, wherein a vibration of said engine in a pregiven frequency range is utilized as said operating variable.

5. The method of claim 4, wherein said vibration is determined with a knock sensor.

6. The method of claim 1, wherein fluctuations of said rpm of said engine are utilized as said operating variable.

7. The method of claim 1, wherein a conductivity between two electrodes of a spark plug is utilized as said operating variable.

8. The method of claim 7, wherein said conductivity is determined based on an ion flow signal.

9. The method of claim 1, wherein a change of pressure in said combustion chamber is utilized as said operating variable.

10. An arrangement for detecting an end of a start operation in an internal combustion engine of a motor vehicle, the arrangement comprising:

means for receiving at least one operating variable of said engine which is other than an rpm of said engine;

means for comparing said at least one operating variable to a pregiven threshold value; and, means for detecting the end of said start operation when said at least one operating variable reaches or exceeds said threshold value.

* * * * *

UNITED STATES PATENT AND TRADEMARK OFFICE

CERTIFICATE OF CORRECTION

PATENT NO. : 6,901,328 B2

DATED : May 31, 2005

INVENTOR(S) : Eckart Damson et al.

It is certified that error appears in the above-identified patent and that said Letters Patent is hereby corrected as shown below:

Column 6,

Line 62, insert -- an -- before "rpm".

Signed and Sealed this

Sixteenth Day of August, 2005

JON W. DUDAS

*Director of the United States Patent and Trademark Office*